United States Patent [19]

Studer

[11] 4,049,641
[45] Sept. 20, 1977

[54] OPTIONALLY SUBSTITUTED SULFOPHENYL-AZO-NAPHTHYLENE-AZO-PARA-ALKOXYPHENYL DYES

[75] Inventor: Martin Studer, Bettingen, Switzerland

[73] Assignee: Sandoz Ltd., Basel, Switzerland

[21] Appl. No.: 642,192

[22] Filed: Dec. 18, 1975

Related U.S. Application Data

[60] Division of Ser. No. 344,935, March 26, 1973, Pat. No. 3,951,590, which is a continuation of Ser. No. 45,546, June 11, 1970, abandoned, which is a continuation-in-part of Ser. No. 743,054, July 8, 1968, abandoned.

[30] Foreign Application Priority Data

July 27, 1967. Switzerland .................. 10645/67

[51] Int. Cl.² .................................... C09B 43/00
[52] U.S. Cl. ........................... 260/191; 260/208
[58] Field of Search .............. 260/174, 177, 185, 191

[56] References Cited

U.S. PATENT DOCUMENTS

| 2,124,689 | 7/1938 | Daudt et al. ............ 260/191 |
| 3,096,140 | 7/1963 | Gaetani ............... 260/174 X |
| 3,451,991 | 6/1969 | Kleiner ................ 260/187 |
| 3,485,814 | 12/1969 | Speck ................. 260/186 |
| 3,862,119 | 1/1975 | Stingl ................ 260/186 |

*Primary Examiner*—Charles F. Warren
*Attorney, Agent, or Firm*—Gerald D. Sharkin; Richard E. Vila; Melvyn M. Kassenoff

[57] ABSTRACT

Compounds of the formula

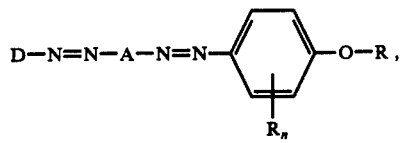

wherein
A is 1,4-naphthylene, substituted 1,4-naphthylene, 1,4-(5,6,7,8-tetrahydronaphthylene) or substituted 1,4-(5,6,7,8-tetrahydronaphthylene),
 wherein each substituent of substituted 1,4-naphthylene and substituted 1,4-(5,6,7,8-tetrahydronaphthylene) is independently lower alkyl, lower alkoxy or halo,
D is sulfophenyl or substituted sulfophenyl wherein each substituent is independently lower alkyl, lower alkoxy, nitro or halo,
each
 R is independently lower alkyl, and
 $n$ is 0 to 2,
and mixtures thereof, are useful for dyeing and printing natural polyamides such as wool and silk, synthetic polyamides such as nylon, polyacrylonitrile, acrylonitrile copolymers and polyvinyl alcohol on which they build-up well. The dyeings are fast to light and wet treatments.

10 Claims, No Drawings

OPTIONALLY SUBSTITUTED SULFOPHENYL-AZO-NAPHTHYLENE-AZO-PARA-ALKOXYPHENYL DYES

This application is a division of application Ser. No. 344,935, filed on Mar. 26, 1973 and now U.S. Pat. No. 3,951,590, which is a continuation of application Ser. No. 45,546, filed June 11, 1970 and now abandoned, which is a continuation-in-part of application Ser. No. 743,054, filed July 8, 1968 and now abandoned.

This application is directed to azo dyes having the formula

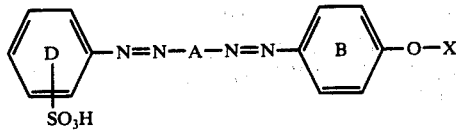

(I), where A stands for an unsubstituted or substituted radical of the formula

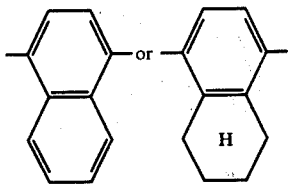

and X is a lower alkyl radical and where the aromatic ring B bears no or 1 or 2 lower alkyl groups and the aromatic ring D may bear further substituents.

The dyes of the formula (I) can be produced by coupling the diazo compound of an amine of the formula

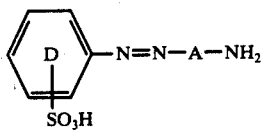

(II)

with a compound of the formula

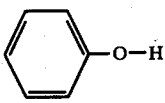

(III)

and alkylating the product of the coupling reaction. The coupling and alkylating reactions are carried out by known methods. Good dyes of this type are those having the formula

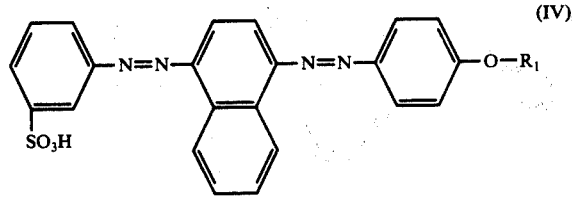

(IV), where $R_1$ represents a methyl or ethyl radical. Similarly good dyes have the formula

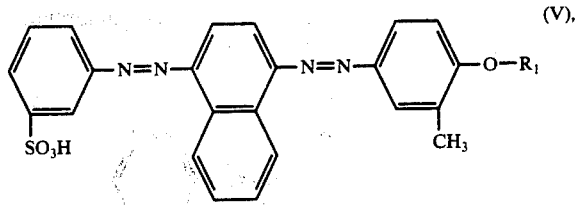

(V), where $R_1$ stands for a methyl or ethyl radical. Mixtures of dyes of formula (I) can be produced by forming a mixture of two or more dyes of the formula

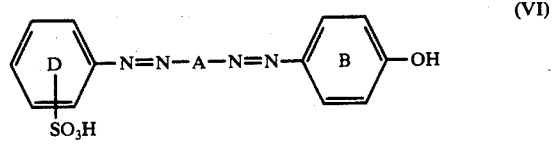

(VI)

with subsequent alkylation, or alternatively by reacting a diazo component of an amine of formula (II) or a mixture of such components with a compound or a mixture of compounds of formula (III) and alkylating the reaction product. Good mixtures contain 1 to 9 parts of one dye per part of another dye. A particularly good mixture is obtained when the dyes are mixed in the ratio of 1:1.

A good dye of mixed composition is obtained with dyes of formulae (IV) and (V) in which $R_1$ represents preferably the ethyl radical. In formula (I) X stands for a lower alkyl radical having 1 to 6 or preferably 1 to 4 carbon atoms. The naphthylene or tetrahydronaphthylene radicals A may bear further substituents, for example lower alkyl or alkoxy, or halogen atoms, preferably chlorine or bromine atoms. The aromatic ring B may contain 0 to 2 lower alkyl groups, for example methyl, ethyl, propyl or isopropyl groups. The aromatic ring D may be substituted by lower alkyl or alkoxy, nitro or halogen, preferably chlorine or bromine. In each instance the term "lower alkyl or alkoxy" refers generally to radicals having 1 to 6 or preferably 1 to 4 or 1 to 3 carbon atoms. The new dyes or dye mixtures may be employed for exhaust dyeing, pad dyeing and printing of natural polyamide fibres, e.g. wool and silk, synthetic polyamide fibres, polyacrylonitrile and polyvinyl alcohol fibres.

Examples of synthetic polyamide fibres to which these dyes are applicable are the types defined in SVF-Fachorgan 15, pp. 8-9 (1960), notably nylon 6 from ε-caprolactam and nylon 66 from adipic acid and hexamethylene diamine. The "Vinyl" (registered trade mark) fibres described in the American Dyestuff Reporter 13, pp. 29-31 (1960) are examples of suitable polyvinyl alcohol fibres. The term "polyacrylonitrile fibres" comprises both acrylonitrile polymers consisting of more than 80% of acrylonitrile and acrylonitrile copolymers consisting of 80-95% acrylonitrile and 20-5% vinyl acetate, vinyl pyridine, vinyl chloride, vinylidene chloride, acrylic acid, acrylic acid ester, methacrylic acid, methacrylic acid ester, etc.

The commonly used wetting, levelling, thickening and other textile auxiliary agents can be employed for dyeing, padding or printing. The dyes are applicable from acid, neutral or weakly alkaline medium in the temperature range of 70°-100° C, or preferably at the boil. They have good power of build-up on the aforenamed substrates and excellent level dyeing properties.

The dyeings have good light and similarly good wet fastness properties such as washing and perspiration fastness. The dye of the formula

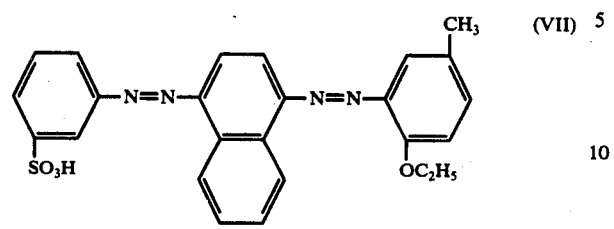

has good light fastness on synthetic polyamide fibres such as nylon 66. It was surprising to find that the dyes of formula (I) and mixtures of these dyes, applied to the same substrate, are faster to light than the dye of this formula and moreover are of greater tinctorial strength and of considerably brighter shade.

In the following Examples the parts and percentages are by weight and the temperatures in degrees centigrade.

EXAMPLE 1

15.6 Parts of 1-aminobenzene-3-sulphonic acid are diazotized with 6.2 parts of sodium nitrite in hydrochloric acid solution and coupled with 12.9 parts of 1-aminonaphthalene. The aminomonoazo dye thus formed is diazotized with 6.5 parts of sodium nitrite and coupled at 0°–5° with 9.4 parts of phenol in solution in 25 parts of 30% sodium hydroxide solution containing 12 parts of sodium carbonate. The resulting disazo dye is dissolved in the cold in 15 parts of 30% sodium hydroxide solution and 32 parts of diethyl sulphate are added thereto. The dye is alkylated at 65° and subsequently purified by the known method.

This dye gives dyeings of very bright orange shade on synthetic polyamide fibres which show good wet fastness properties and excellent light fastness.

EXAMPLE 2

The amino azo dye formed as described in Example 1 is coupled in the same manner with 1-hydroxy-2-methylbenzene and the resulting dye is ethylated as given in Example 1, whereupon a dye of similarly good quality is obtained.

EXAMPLE 3

The aminoazo dye prepared according to Example 1 is coupled in the same manner with a mixture of 4.3 parts of phenol and 5.3 parts of 1-hydroxy-2-methylbenzene. The mixed dye thus formed is ethylated, again in accordance with Example 1, whereupon a dye of mixed constitution is obtained which has similarly good fastness properties.

DYEING EXAMPLE

A dyebath is prepared at 50° with 1000 parts of water, 2 parts of a sulphonated ester of an unsaturated fatty acid of high molecular weight with a degree of sulphonation of 99% and 2 parts of ammonium sulphate. A fabric of synthetic polyamide fibre is immersed in the bath and treated for 15 minutes, after which time 1 part of the dye of Example 1 is added and the dyebath raised to the boil over 30–45 minutes. Dyeing is continued for 1 hour at the boil. An orange dyeing with good light and wet fastness properties is obtained.

The following table gives details of the structural composition of further dyes which can be produced in accordance with the procedures of Examples 1 to 3. These dyes correspond to the formula

In column (I) the position of the —SO₃H— group in ring D is given, in column (II) the meaning of the radical A, in column (III) the position and nature of the substituent on the ring B, in column (IV) the meaning of X and in column (V) the shade of the dyeing on nylon.

| Expl. No. | Position of —SO₃H in ring D (I) | A (II) | Position and nature of substituent on ring B (III) | X (IV) | Shade of dyeing on nylon (V) |
|---|---|---|---|---|---|
| 4 | 3- | naphthalene | (3-)-CH₃ | —C₂H₅ | orange |
| 5 | 4- | naphthalene | H | —C₃H₇ | orange |

Formulae of representative dyes of the foregoing Examples are as follows:

EXAMPLE 1

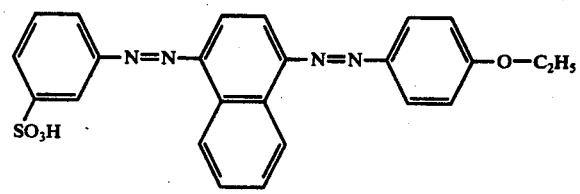

EXAMPLE 2

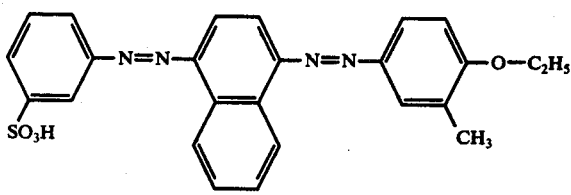

EXAMPLE 3

1:1 mixture of the dyes of the formulae

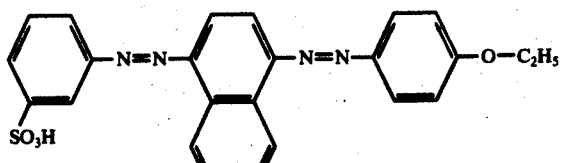

and

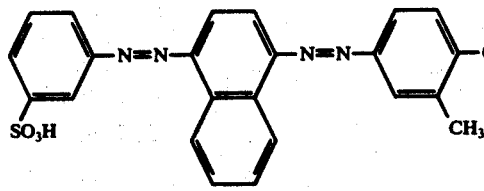

EXAMPLE 4

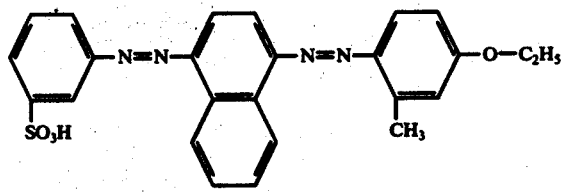

Having thus disclosed the invention what we claim is:
1. A compound of the formula

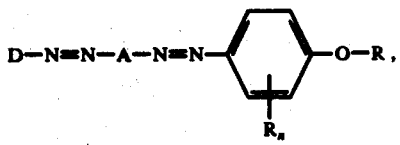

wherein
D is sulfophenyl or substituted sulfophenyl wherein each substituent is independently alkyl of 1 to 4 carbon atoms, alkoxy of 1 to 4 carbon atoms, nitro, chloro or bromo,
A is 1,4-naphthylene, substituted 1,4-naphthylene, 1,4-(5,6,7,8-tetrahydronaphthylene) or substituted 1,4-(5,6,7,8-tetrahydronaphthylene), wherein each substituent of substituted 1,4-naphthylene and substituted 1,4-(5,6,7,8-tetrahydronaphthylene) is independently lower alkyl,
lower alkoxy, chloro or bromo,
each
R is independently alkyl of 1 to 4 carbon atoms, and $n$ is 0, 1 or 2.
2. A compound according to claim 1
wherein
D is sulfophenyl or monosubstituted sulfophenyl wherein the substituent is alkyl of 1 to 4 carbon atoms, alkoxy of 1 to 4 carbon atoms, nitro, chloro or bromo, and
A is 1,4-naphthylene, monosubstituted 1,4-naphthylene, 1,4-(5,6,7,8-tetrahydronaphthylene) or monosubstituted 1,4-(5,6,7,8-tetrahydronaphthylene), wherein the substituent of monosubstituted 1,4-naphthylene and monosubstituted 1,4-(5,6,7,8-tetrahydronaphthylene) is lower alkyl, lower alkoxy, chloro or bromo.
3. A compound according to claim 2 having the formula

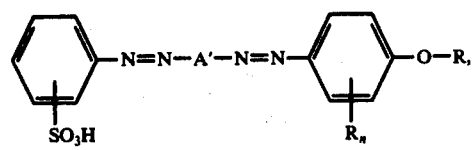

wherein
A' is 1,4-naphthylene or 1,4-(5,6,7,8,-tetrahydronaphthylene),
each
R is independently alkyl of 1 to 4 carbon atoms, and $n$ is 0, 1 or 2.
4. A compoound according to claim 3 having the formula

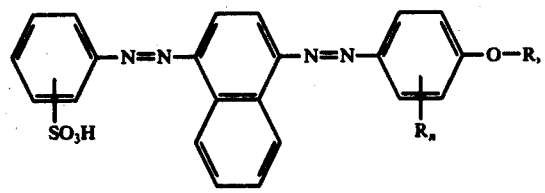

wherein each
R is independently alkyl of 1 to 4 carbon atoms, and $n$ is 0, 1 or 2.
5. A compound according to claim 4 wherein $n$ is 0 or 1.
6. A compound according to claim 5 having the formula

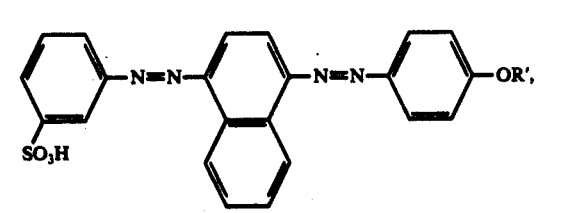

wherein
R' is methyl or ethyl.
7. A compound according to claim 5 having the formula

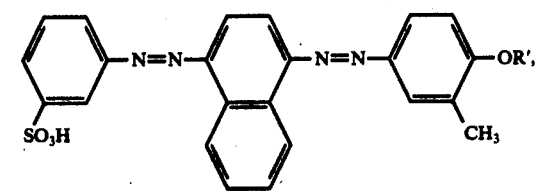

wherein
R' is methyl or ethyl.
8. The compound according to claim 5 having the formula

9. The compound according to claim 5 having the formula
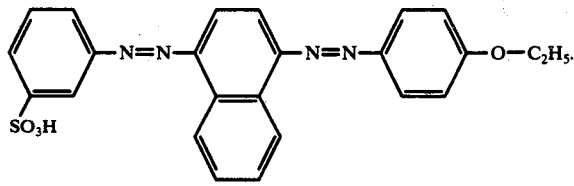
10. The compound according to claim 5 having the formula
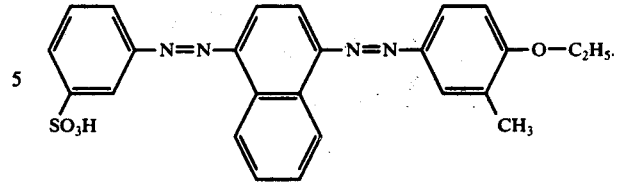
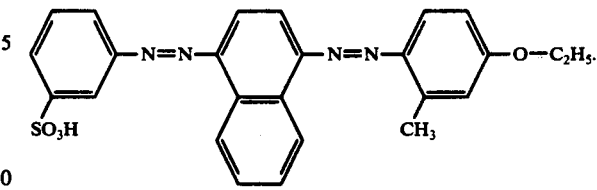
* * * * *